United States Patent
Dumov et al.

(10) Patent No.: US 7,174,405 B1
(45) Date of Patent: Feb. 6, 2007

(54) METHOD AND SYSTEM FOR REPLACING A READ-MODIFY-WRITE OPERATION WITH AN ATOMIC SET-BITS OR CLEAR-BITS OPERATION

(75) Inventors: Leo Dumov, Cupertino, CA (US); Eddie B. Collins, Jr., San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 415 days.

(21) Appl. No.: 10/456,344

(22) Filed: Jun. 6, 2003

(51) Int. Cl.
*G06F 12/00* (2006.01)

(52) U.S. Cl. ............ 710/200; 711/202; 711/100; 711/3; 711/145; 714/30; 714/710; 713/324

(58) Field of Classification Search .......... None
See application file for complete search history.

(56) References Cited

U.S. PATENT DOCUMENTS

| | | | | |
|---|---|---|---|---|
| 5,235,543 A | * | 8/1993 | Rosen | 365/154 |
| 5,287,503 A | * | 2/1994 | Narad | 710/220 |
| 5,367,660 A | * | 11/1994 | Gat et al. | 711/3 |
| 5,717,898 A | * | 2/1998 | Kagan et al. | 711/145 |
| 5,870,616 A | * | 2/1999 | Loper et al. | 713/324 |
| 6,311,258 B1 | * | 10/2001 | Gibson et al. | 711/200 |
| 6,598,177 B1 | * | 7/2003 | Jones et al. | 714/30 |
| 6,907,510 B2 | * | 6/2005 | Bennett et al. | 711/202 |
| 2002/0126663 A1 | * | 9/2002 | Katzman et al. | 370/389 |
| 2005/0235096 A1 | * | 10/2005 | Taylor et al. | 711/100 |
| 2005/0262403 A1 | * | 11/2005 | Palus | 714/710 |
| 2006/0059289 A1 | * | 3/2006 | Ng et al. | 710/305 |

OTHER PUBLICATIONS

HyperTransport™ I/O Link Specification, Revision 1.04, May 30, 2002; pp. 23-25,47-48,135-137; copyright 2001, 2002 HyperTransport™ Technology Consortium.

* cited by examiner

*Primary Examiner*—Rehana Perveen
*Assistant Examiner*—Brian Misiura
(74) *Attorney, Agent, or Firm*—Charles E. Krueger

(57) ABSTRACT

A method and system for updating registers by performing an atomic read-modify-write operations initiated by a host over a host/daughtercard bus. A field in the write command determines whether data included in the write command is written to a targeted register or used as a mask to set or clear selected bits in a word held in the targeted register.

12 Claims, 3 Drawing Sheets

0010010 xxxxxxx

FIG. 3 xx1xxx1x

FIG. 3A

0010010 xxxxxxx

FIG. 4 xx0xxx0x

FIG. 4A

METHOD AND SYSTEM FOR REPLACING A READ-MODIFY-WRITE OPERATION WITH AN ATOMIC SET-BITS OR CLEAR-BITS OPERATION

BACKGROUND OF THE INVENTION

It is common in microprocessor-based electronic equipment to include two or more interconnected printed circuit boards, often including a main circuit board having a main controller or microprocessor (after termed the "motherboard" or "host") and one or more connected daughtercards. In many electronic devices, some or all of the daughtercards may themselves be "intelligent", i.e., may have their own programmable controllers.

For example, embedded systems which run complex operating systems and applications on a host/motherboard system often depend on intelligent daughtercards (cards controlled by a microprocessor, ASIC, or FPGA) to provide the functionality of a network interface.

One important system requirement is a host/daughtercard interface to transfer data between the host memory and the memory on board the daughtercard. Additionally, the host must be able to manage the memory of the daughtercard and also initialize and reconfigure the daughtercard in response to end user changes to the system.

Often, daughtercards, such as network interface cards or line cards, must be backward compatible to the host system and must use a low-bandwidth bus for both transferring packet data to be transferred to the network and control/configuration data.

For example, the host/daughtercard interface may be mechanically limited to a small number of pins and therefore must be used very efficiently to transfer data to a high speed network interface such as Gigabit Ethernet.

In particular, register updates on the daughtercard steal bandwidth required to transmit network data. A standard technique for updating register bits is a read-modify-write operation that requires three separate bus operations—read a register across host/daughtercard bus and store it's value in the host memory, modify stored context of the register by applying logical OR or AND operations, and write the modified value back to the register across the host/daughtercard bus. This approach also requires that all registers contexts be stored in the host memory. The stored copy may become "off-sync" with the real register values due to either software bugs or the faulty hardware controller design, which will result in the wrong system behavior.

Accordingly, improved and cost effective techniques for implementing daughtercard register updates without consuming excessive bandwidth on the host/daughtercard bus are required in many systems.

BRIEF SUMMARY OF THE INVENTION

In one embodiment of the invention, a write command issued by the host and destined for a particular register, includes data that will be utilized in different manners to change the value of a word held in the register depending on the value held in a specified field of the write command.

In another embodiment of the invention, the specified field is an opcode which controls how data included in the write command is utilized by the daughtercard.

In another embodiment of the invention, the specified field is an address field and each register has three address aliases. The selection of a particular register address alias controls how data included in the write command is utilized by the daughtercard.

In another embodiment of the invention, the daughtercard/host interface hardware defines three memory regions for each block of memory which supports the atomic read-modify-write operation. The first of the three memory regions will support the normal write operation, which replaces the entire context of the register with the value supplied by the write frame. The second memory region will support "set bits" operation which will set only some bits of the register, based on the value of the write frame to this memory region. The last third memory region will support "clear bits" operation, which will clear some bits in the register based on the value supplied by the write frame to this memory region. As it follows from the above description, all 3 memory regions address the same block of registers in the daughtercard/host interface.

In another embodiment of the invention, the daughtercard logic will translate a particular memory offset (region) into the appropriate write operation.

In another embodiment of the invention, a host issued write command includes an opcode that determines whether data in the write command is treated as data, a set bit mask, or a clear bit mask daughtercard/host interface.

Other features and advantages will be apparent in view of the following detailed description and appended drawings.

BRIEF DESCRIPTION OF THE DRAWINGS

FIG. 3 is a schematic diagram depicting the mask for setting selected bits of a word held in a selected register;

FIG. 3A is a schematic diagram depicting the result of applying the set bits mask to a register value;

FIG. 4 is a schematic diagram depicting the mask for clearing selected bits of a word held in a selected register;

FIG. 4A is a schematic diagram depicting the result of applying the clear bits mask to a register value;

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The invention will now be described with reference to various embodiments implemented in a routing platform. In the following, the term routing platform is utilized broadly to include any component such a router, bridge, switch, layer 2 or layer 3 switch, gateway, etc., that refers to components utilized to implement connectivity within a network or between networks. In the following, embodiments will be described, by way of example, not limitation, that operate on routing platforms designed and manufactured by the assignee of the present patent application. However, it is understood by persons of skill in the art that the invention has broad utility in any routing platform.

Figure 1:
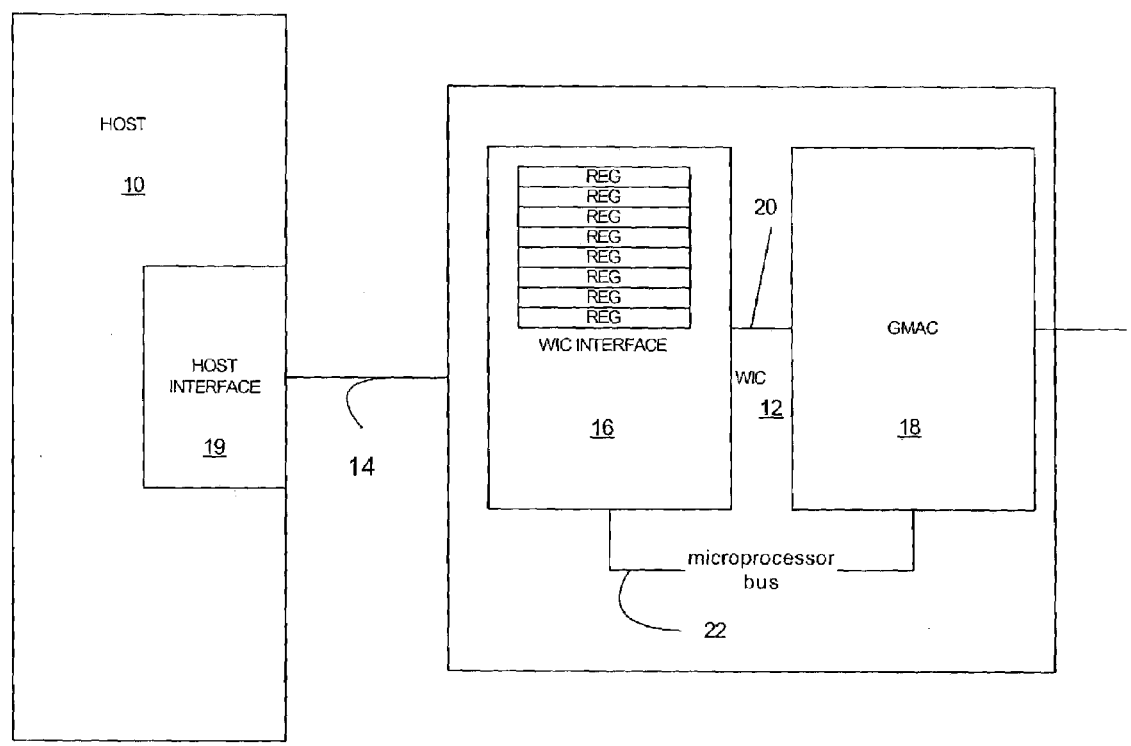
FIG. 1 is a block diagram of a system for implementing an embodiment of the invention.

FIG. 1 depicts a system which can be utilized to implement an embodiment of the invention. In FIG. 1, a host 10 is coupled to a daughtercard 12 by a host/daughtercard bus 14. In this example, the daughtercard 12 is a WAN Interface Card (WIC) including a WIC interface 16 and a Gigabyte Ethernet Media Access Controller (GMAC) 18. The host includes a host interface 19 for interfacing with host/daughtercard bus 14 while the WIC interface 16 performs the interface functions on the WIC side of the host/daughtercard bus 14. The WIC interface 16 and GMAC 18 are coupled by a high-speed data bus 20 and a microprocessor bus 22.

In this embodiment the host/daughtercard bus 14 is a 16 bit full duplex bus (8 bits in each direction) with a speed of 400 MB/sec. The WIC is coupled to a Gigabyte Ethernet by a SFP (small form factor pluggable module) 23 that has a speed of up to 2 GB/sec. Accordingly, the host/daughtercard bus 14 must be efficiently utilized to service the WIC.

Referring again to FIG. 1, the WIC interface 16, which can be implemented as an FPGA, includes a register set holding values to configure and control the operation of the WIC 12. As is well-known in the art, many of the register values are set during an initialization process when the WIC 12 is powered-up or reset. The bit positions in many of these registers will be changed during operation to reflect changing conditions. There are two standard techniques for changing the value of a bit held in a register.

The first technique is to maintain a copy of all register values in host memory. When a selected bit value is to be changed the copy of the register value is processed to change the selected bit value to form a modified register value which is then written to the register over the host/daughtercard bus 14.

The second technique is a read-modify-write operation. The current register value copy is read by the host over the host/daughtercard bus 14, modified at the host to change the selected bit value, and then written back to the register over the host/daughtercard bus 14. If the register is locked out during this process so that the value of another bit cannot be modified then the operation is termed "atomic".

In both the above techniques careful design is required so that the copy of the register stored at the host does not become "off-synch" with the register values held in the registers due to either software bugs or hardware controller design problems. If these values are "off-synch" then incorrect system behavior will result.

In the currently described system, a very serious problem with the second technique is the bandwidth consumed by the read-modify-write operation. In this system, the register is read by a read command issued by the host and a response by the WIC includes the requested data. Subsequent to being modified at the host, the data is then written by a write command issued by the host. Thus two separate commands and an acknowlegement are sent over the bus and, in this embodiment, each command may consume several bus cycles for this operation and the operation is not atomic. The register is not locked-out between the read and write operation.

An overview of an embodiment of the present invention will now be described. Three types of operations are created to allow the host to access registers on the WIC. These operations are "normal write", "set bits", "clear bits" operations. The normal write operation rewrites the entire contents of the register; the "set bits" operation sets selected bit values of the word held in the register; and, the "clear bits" operation clears selected bits in the word held in the register.

Figure 2:
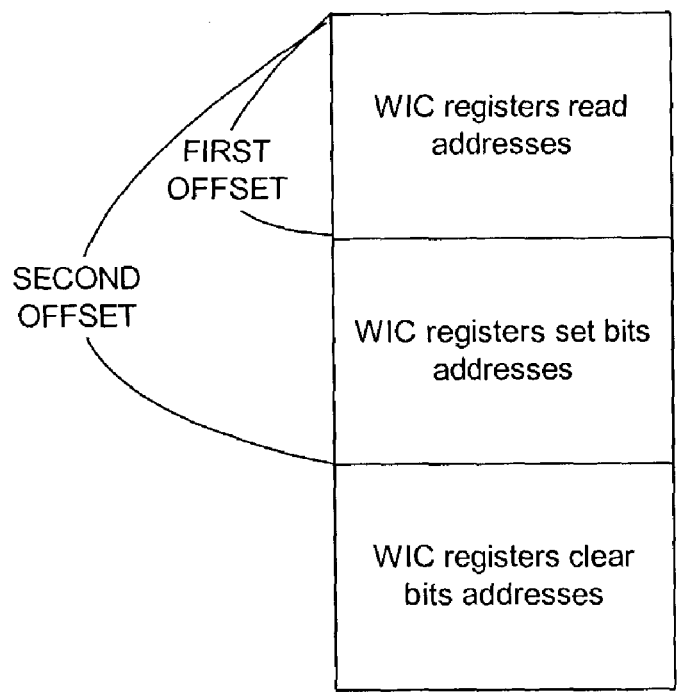
FIG. 2 is a block diagram of a memory map depicting the aliasing of the register addresses.

A first embodiment of the invention uses a memory aliasing technique to make read-modify-write operations to the WIC. For this purpose the WIC hardware memory map will be duplicated twice at a different offsets to define different types of the access as depicted in FIG. 2. Thus, the driver will address a total of 3 memory regions, each of them addresses the same set of registers.

The first region at offset 0 is used for the basic write operations. This means that the entire contents of the register will be replaced by the data held in the write command.

The second region, at offset 0x4000, in this embodiment, is used for the read-modify-write operation that clears bits in a particular register. In this case the specified data will be the mask; only bits in the register data at bit positions corresponding to bit positions in the mask holding "1" values will be cleared. This process is depicted in FIGS. 3 and 3A.

The third region, at offset 0x8000 is used for the read-modify-write operation that sets bits in a particular register. In this case the specified data will be the mask; only bits in the register data at bit positions corresponding to bit positions in the mask holding "1" values will be set. This process is depicted in FIGS. 4 and 4A.

This method of addressing will reduce overhead of the traditional read-modify-write, which will include 3 separate operations: read across WIC bus, modify the value, write the modified value back to the register.

In this embodiment, WIC software driver, which is host/platform software, controls WIC operations. This driver includes macros to address the registers of the WIC interface when generating write commands. If the data is to be used as a mask to set specific bits in a WIC registers then the register address included in the write command is modified by adding a first offset to the address. If the data is to be used as a mask to clear specific bits in the WIC register then the register address included in the write command is modified by adding a second offset to the address.

The WIC interface defines 3 memory regions for the block of registers. Thus, if the write command includes the register address with no offset then the normal write register operation is implemented. If the write address is offset by the first offset, for example 0x4000, then the WIC interface hardware interprets the write data as a mask, the register is read by the WIC interface, bit positions indicated by the mask are set, and the data is rewritten to the register. If the write address is offset by 0x8000 then the WIC interface hardware interprets the write data as a mask, the register is read by the WIC interface, bit positions indicated by the mask are cleared, and the data is rewritten to the register.

Note that in the above-described set and clear operations the setting and clearing are done on the WIC interface and no transactions over the host/daughtercard bus 14 are required except for the original write command. Accordingly, the bus bandwidth is freed up to perform the most important function of transferring packet data between the host and WIC.

Figure 5:
FIG. 5 is a block diagram of an write command including an opcode for controlling how the data word is utilized at the daughtercard.

A second embodiment of the invention will now be described. As depicted in FIG. 5, the write command includes an opcode field which can hold one of three opcodes which are used to interpret the data portion of the write command as either write data, a bit-set mask, or a bit-clear mask depending on the value of the opcode. The WIC interface will decode the opcode and perform the indicated operation as described above.

The invention may be implemented in hardware or as program code, stored on a computer readable medium, that is executed by a digital processor. The computer readable medium may include, among other things, magnetic media, optical media, electro-magnetic fields encoding digital information, and so on. As is known in the art, various combinations of hard-wired logic or programmed logic can be utilized. For example, the host interface can be a controller executing WIC driver software and the WIC interface could be implemented as an FPGA (field programmable gate array).

The invention has now been described with reference to the preferred embodiments. Alternatives and substitutions will now be apparent to persons of skill in the art. Accordingly, it is not intended to limit the invention except as provided by the appended claims.

What is claimed is:

1. A system for updating register values on a daughtercard connected to a host by a host/daughtercard bus, said system comprising:
  a host interface configured to issue write commands for writing data from the host to the daughtercard over the host/daughtercard bus, with the write command including an address field specifying a location on the daughtercard where data is to be written, a first field for holding an opcode, and data field holding data to be written to the daughtercard where the host interface inserts a first opcode in the first field if data included in the write command is to be written to a selected register, inserts a second opcode in the first field if data included in the write command is to be used as a mask to set selected bits in a register word held in the selected register, and inserts a third opcode in the first field if the data included in the write command is to be used as a mask to clear selected bits in a register word held in the selected register; and
  a daughtercard interface for receiving the write commands and decoding the first field in the command to either write the data included in the write command to the selected register if the first opcode is held in the first field, to utilize the data included in the write command as a mask to set selected bits in a word held in the selected register if the second opcode is included in the first field, or to utilize the data included in the write command as a mask to clear selected bits in the word included in the selected register if the third opcode is included in the first field.

2. A method for updating register values on a daughtercard connected to a host by a host/daughtercard bus, said method comprising the steps of:
  at the host:
  issuing a write command including a first field, an address field indicating a specified register, and a data field;
  inserting a first opcode value in the first field if the data field is to be written to a specified register on the daughter card;
  inserting a second opcode value in the first field if the data field is to be utilized as a mask to set specific bits in a data value held at the specified register;
  inserting a third opcode value in the first field if the data field is to be utilized as a mask to clear specific bits in a data value held at the specified register; and
  transmitting the write command to the daughtercard;
  at the daughtercard:
  receiving the write command;
  decoding the opcode value and writing the data field of the write command to the specified register if the first opcode value is included in the first field of the write command;
  decoding the opcode value and utilizing the data field of the write command as a mask to set specific bits of a data value held in the specified register if the second opcode value is included in the first field of the write command; and
  decoding the opcode value and utilizing the data field of the write command as a mask to clear specific bits of a data value held in the specified register if the third opcode value is included in the first field of the write command.

3. A computer program product for use on a system that updates register values on a daughtercard connected to a host by a host/daughtercard bus, the computer program product comprising:
  at the host:
  a host interface including a processor for executing computer readable program code;
  a computer usable medium having computer readable program code physically embodied therein, said computer program product further comprising:
  computer readable program code for causing the processor to issue a write command including a first field, an address field indicating a specified register, and a data field;
  computer readable program code for causing the processor to insert a first opcode value in the first field if the data field is to be written to a specified register on the daughter card;
  computer readable program code for causing the processor to insert a second opcode value in the first field if the data field is to be utilized as a mask to set specific bits in a data value held at the specified register;
  computer readable program code for causing the processor to insert a third opcode value in the first field if the data field is to be utilized as a mask to clear specific bits in a data value held at the specified register; and
  computer readable program code for causing the processor to transmit the write command to the daughtercard;
  at the daughtercard:
  a daughtercard interface for receiving the write command and including a processor for executing computer readable program code and a register set including the specified register;
  computer readable program code for causing the processor to decode the opcode value and write the data field of the write command to the specified register if the first opcode value is included in the first field of the write command;
  computer readable program code for causing the processor to decode the opcode value and utilize the data field of the write command as a mask to set specific bits of a data value held in the specified register if the second opcode value is included in the first field of the write command; and
  computer readable program code for causing the processor to decode the opcode value and utilize the the data field of the write command as a mask to clear specific bits of a data value held in the specified register if the third opcode value is included in the first field of the write command.

4. A system for updating register values on a daughtercard connected to a host by a host/daughtercard bus, said system comprising:

at the host:

means for issuing a write command including a first field and a data field;

means for inserting a first opcode value in the first field if the data field is to be written to a specified register on the daughter card;

means for inserting a second opcode value in the first field if the data field is to be utilized as a mask to set specific bits in a data value held at the specified register;

means for inserting a third opcode value in the first field if the data field is to be utilized as a mask to clear specific bits in a data value held at the specified register; and transmitting the write command to the daughtercard;

at the daughtercard:

means for receiving the write command;

means for decoding the opcode value and writing the data field of the write command to the specified register if the first opcode value is included in the first field of the write command;

means for decoding the opcode value and utilizing the data field of the write command as a mask to set specific bits of a data value held in the specified register if the second opcode value is included in the first field of the write command; and means for decoding the opcode value and utilizing the data field of the write command as a mask to clear specific bits of a data value held in the specified register if the third opcode value is included in the first field of the write command.

5. A system for updating register values on a daughtercard connected to a host by a host/daughtercard bus, said system comprising:

a host interface configured to issue write commands for writing data from the host to the daughtercard over the host/daughtercard bus, with the write command including an address field specifying a location on the daughtercard where data is to be written, a first field for holding an opcode that is decoded on the daughtercard, and a data field to be written to the daughtercard, where the host interface inserts a first opcode value in the first field the if data field included in the write command is to be written to a selected register, inserts a second opcode value in the first field if data field included in the write command is to be used as a mask to set selected bits in a register word held in the selected register, and inserts a third opcode value in the first field if the data field included in the write command is to be used as a mask to clear selected bits in a register word held in the selected register.

6. A system, implemented on the host, for updating register values on a daughtercard connected to a host by a host/daughtercard bus, said system comprising:

means for issuing a write command including an address field, a first field holding an opcode value to be decoded at the daughtercard, and a data field;

means for inserting a first opcode value in the first field if the data field is to be written to a specified register on the daughter card;

means for inserting a second opcode value in the first field if the data field is to be utilized as a mask to set specific bits in a data value held at the specified register;

means for inserting a third opcode value in the first field if the data field is to be utilized as a mask to clear specific bits in a data value held at the specified register; and means for transmitting the write command to the daughtercard.

7. A method, performed on the host, for updating register values on a daughtercard connected to a host by a host/daughtercard bus, said method comprising the steps of:

issuing a write command including an address field, a first field holding an opcode value to be decoded at the daughtercard, and a data field;

inserting a first opcode value in the first field if the data field is to be written to a specified register on the daughter card;

inserting a second opcode value in the first field if the data field is to be utilized as a mask to set specific bits in a data value held at the specified register;

inserting a third opcode value in the first field if the data field is to be utilized as a mask to clear specific bits in a data value held at the specified register.

8. A computer program product for use on the host of a system that updates register values on a daughtercard connected to a host by a host/daughtercard bus, the computer program product comprising:

a host interface including a processor for executing computer readable program code;

a computer usable medium having computer readable program code physically embodied therein, said computer program product further comprising:

computer readable program code for causing the processor to issue a write command including an address field, a first field holding an opcode that is decoded on the daughtercard, and a data field;

computer readable program code for causing the processor to insert a first opcode value in the first field if the data field is to be written to a specified register on the daughter card;

computer readable program code for causing the processor to insert a second opcode value in the first field if the data field is to be utilized as a mask to set specific bits in a data value held at the specified register;

computer readable program code for causing the processor to insert a third opcode value in the first field if the data field is to be utilized as a mask to clear specific bits in a data value held at the specified register; and computer readable program code for causing the processor to transmit the write command to the daughtercard.

9. A system, implemented on a daughtercard, for updating register values on a daughtercard connected to a host by a host/daughtercard bus, said system comprising:

a daughtercard interface for receiving write commands including an address field, a first field holding an opcode value, and a data field and decoding the first field in the command to either write the data field included in the write command to the selected register if the a first opcode value is held in the first field, to utilize the data field included in the write command as a mask to set selected bits in a word held in the selected register if a second opcode value is included in the first field, or to utilize the data field included in the write command as a mask to clear selected bits in the word included in the selected register if a third opcode value is included in the first field.

10. A system, implemented on a daughtercard, for updating register values on a daughtercard connected to a host by a host/daughtercard bus, where the daughtercard receives a write command including an address field, a first field holding an opcode, and a data field, said system comprising:

means for decoding the opcode value held in the first field of a received write command;

means for writing the data field of the write command to the specified register if a first opcode value is included in the first field of the write command;

means for utilizing the data field of the write command as a mask to set specific bits of a data value held in the specified register if a second opcode value is included in the first field of the write command; and means for utilizing the data field of the write command as a mask to clear specific bits of a data value held in the specified register if a third opcode value is included in the first field of the write command.

11. A computer program product for use on the daughtercard of a system that updates register values on a daughtercard connected to a host by a host/daughtercard bus, the computer program product comprising:

a daughtercard interface including a processor for executing computer readable program code and a register set including the specified register, where the daughter card interface receives a host write command including an address field, a first field holding an opcode value decoded by the daughtercard interface, and a data field to be written to a register specified by the address field;

a computer usable medium having computer readable program code physically embodied therein, said computer program product further comprising:

computer readable program code for causing the processor to write the data field of the write command to the specified register if a first opcode value is included in the first field of the write command;

computer readable program code for causing the processor to utilize the data field of the write command as a mask to set specific bits of a data value held in the specified register if a second opcode value is included in the first field of the write command; and computer readable program code for causing the processor to utilize the data field of the write command as a mask to clear specific bits of a data value held in the specified register if a third value is included in the first field of the write command.

12. A method, implemented on a daughtercard, for updating register values on a daughtercard connected to a host by a host/daughtercard bus, where the daughtercard receives a write command including an address field, a first field holding a opcode value, and a data field, said method comprising the steps of:

decoding the opcode value in the first field of a received write command;

writing the data field of the write command to the specified register if a first opcode value is included in the first field of the write command;

utilizing the data field of the write command as a mask to set specific bits of a data value held in the specified register if a second opcode value is included in the first field of the write command; and utilizing the data field of the write command as a mask to clear specific bits of a data value held in the specified register if a third opcode value is included in the first field of the write command.

* * * * *